United States Patent

Eichin et al.

[15] 3,639,130
[45] Feb. 1, 1972

[54] SHIRRED CASING STICK

[72] Inventors: Harry Paul Eichin, Western Springs, Ill.; Kenneth Moritz Jones, Bayamon, P.R.

[73] Assignee: Union Carbide Corporation, New York, N.Y.

[22] Filed: Mar. 5, 1969

[21] Appl. No.: 804,452

[52] U.S. Cl..............................99/175, 128/157, 210/484
[51] Int. Cl............................................................B65b 61/00
[58] Field of Search....................99/175, 176, 171; 128/334, 128/262, 157; 138/124, 125; 156/210, 213, 215, 470; 210/484

[56] References Cited

UNITED STATES PATENTS

| | | | |
|---|---|---|---|
| 1,505,218 | 8/1924 | Sartore | 99/116 UX |
| 2,434,317 | 1/1948 | Gross | 128/157 UX |
| 2,715,903 | 8/1955 | Scholl | 128/157 |
| 2,781,619 | 2/1957 | Gardes | 210/484 X |
| 2,969,420 | 1/1961 | Gregoire | 138/124 X |
| 3,193,604 | 7/1965 | Mercer | 99/176 UX |
| 3,216,578 | 11/1965 | Wright | 210/484 |

FOREIGN PATENTS OR APPLICATIONS

| | | | |
|---|---|---|---|
| 750,396 | 6/1956 | Great Britain | 210/493 |

*Primary Examiner*—Frank W. Lutter
*Assistant Examiner*—Robert Halper
*Attorney*—Paul A. Rose and John F. Hohmann

[57] ABSTRACT

A shirred casing stick having a bore is sheathed and lined within a binding adapted to maintain the integrity of the stick and the compaction of the shirred wall thereof throughout the handling and water soaking operations preceding stuffing. The binding comprises a tubular length of flexible, reticulated material extending under tension over the outside surface of the stick and through the bore, both extremities of the tubular length being secured to each other at one end of the stick.

4 Claims, 10 Drawing Figures

PATENTED FEB 1 1972 3,639,130
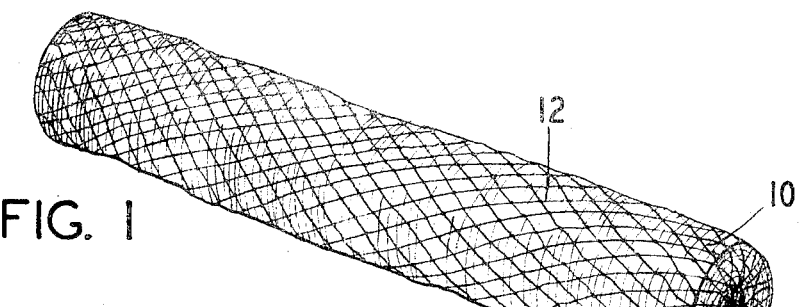
FIG. 1
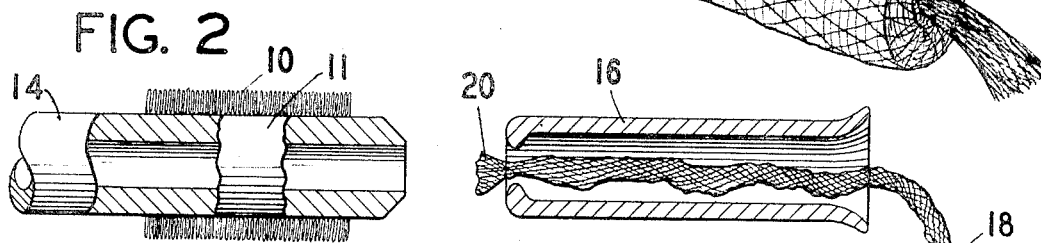
FIG. 2   FIG. 3
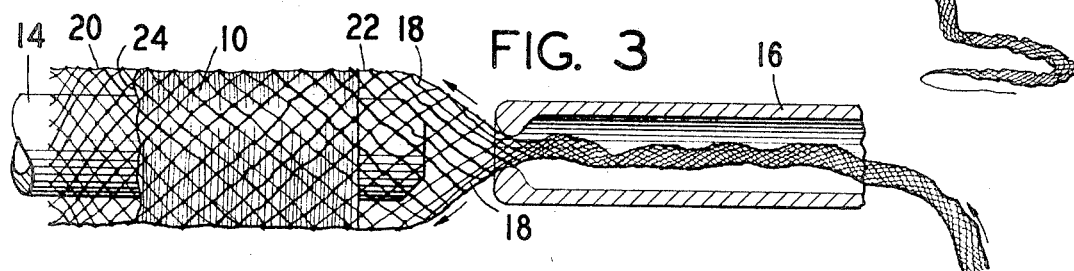
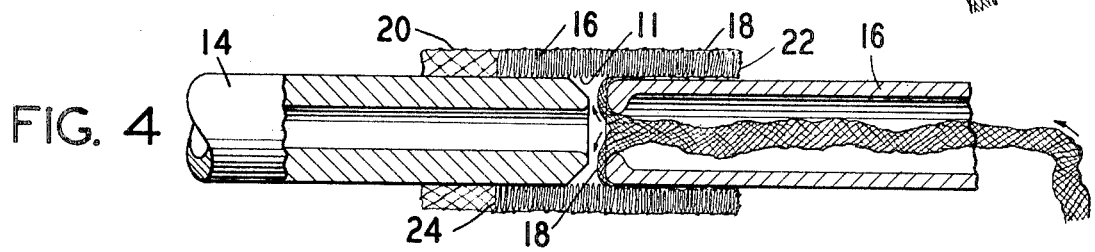
FIG. 4
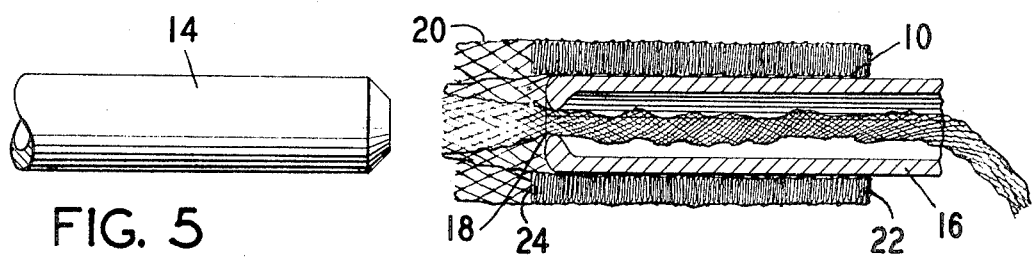
FIG. 5
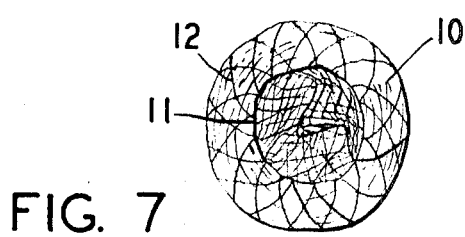
FIG. 7
INVENTORS
HARRY P. EICHIN
KENNETH M. JONES
BY John F. Hamann
ATTORNEY INVENTORS
HARRY P. EICHIN
KENNETH M. JONES
BY John F. Hofmann
ATTORNEY

SHIRRED CASING STICK

This invention relates to a stick of shirred, compressed food casing, and more particularly, to a stick of shirred tubular food casing sheathed and lined with a flexible material adapted to protect the stick from breakage and/or premature deshirring throughout the handling and the water-soaking steps which precede the meat stuffing of the shirred stick.

Cellulosic casings of intermediate size, either reinforced with fibrous material or not, are produced in circumference sizes generally ranging from about 5 inches to about 9¾ inches. They may be sold to the meat packer either in a flat condition and cut to a maximum length of up to about 3 feet, or in 55-foot lengths in the form of sticks shirred and compacted to a length of about 14 inches. These intermediate size casings have a wall thicker than that of the small-diameter casings used in the production of sausages such as frankfurters and which generally have a circumference within the range of from about 1¾ to about 4¾ inches. When shirred, the pleats in the thicker walls of the larger size casings cannot be compacted as much as those in the thinner walls of the small-diameter casings. As a result, these larger sticks do not retain their integrity as well as the smaller casing sticks and tend to break and deshirr. In order to overcome this disadvantage, the larger sticks are conventionally provided with a core, preferably in the form of a tube of plastic material, inserted into the bore of the stick immediately after shirring, decompaction of the stick being prevented by a pin or a peg extending transversely through the walls of the tube at both extremities thereof and restraining the stick endwise.

This core and peg arrangement is relatively expensive. Moreover, before the meat-stuffing operation, the sticks must be immersed and soaked in water to impart to the wall of the casing the flexibility necessary for such operation. The core and the casing restraining pegs do not permit ready soaking of the inside wall of the sticks. Furthermore, for the stuffing operation, the core has to be removed to permit placement of the sticks on a stuffing horn, or a horn of smaller size must be used if the core is a tube and is placed on the horn with the sticks. In either case, the sticks often tend to deshirr as soon as the pegs are withdrawn from the tube, thus requiring additional and time-consuming manipulations on the part of the stuffer operator.

It is an object of the invention to provide a stick of shirred food casing with a novel binding adapted to maintain the integrity of the stick throughout the operations which precede the stuffing of said stick.

It is another object of the invention to provide a stick of shirred tubular food casing sheathed and lined with a flexible reticulated material forming a binding for the stick, said reticulated material maintaining the integrity of the stick and the compaction of the pleats while permitting rapid and complete soaking of both the outside and inside surfaces of said stick.

It is a further object of the invention to provide a method for producing a shirred casing stick sheathed and lined with a flexible reticulated material.

The foregoing and additional objects will become more fully apparent from the following description and the accompanying drawing in which:

FIG. 1 is a perspective view of a shirred and compacted casing stick sheathed and lined with a length of flexible, tubular, reticulated material according to one embodiment of the invention;

FIG. 2 is a view partially in elevation and partially in section of a shirring mandrel with a shirred and compacted stick on said mandrel and of a hollow auxiliary mandrel with a length of flexible, tubular reticulated material passed therethrough;

FIGS. 3 to 5 are views similar to that of FIG. 2 showing various steps of a first embodiment of the method for producing the stick sheathed and lined as illustrated in FIG. 1;

FIG. 7 is an end view of the stick of FIG. 1 showing the other, open end of the stick sheathed and lined with the tubular length of reticulated material;

Figure 8:
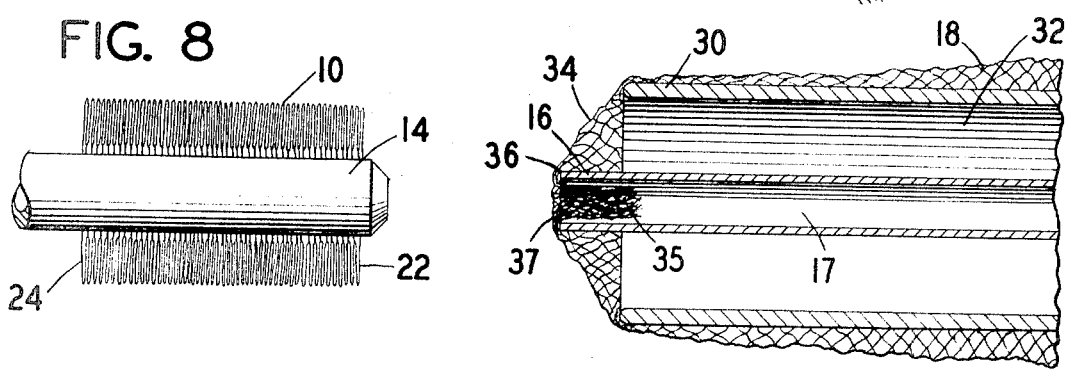
Figure 9:
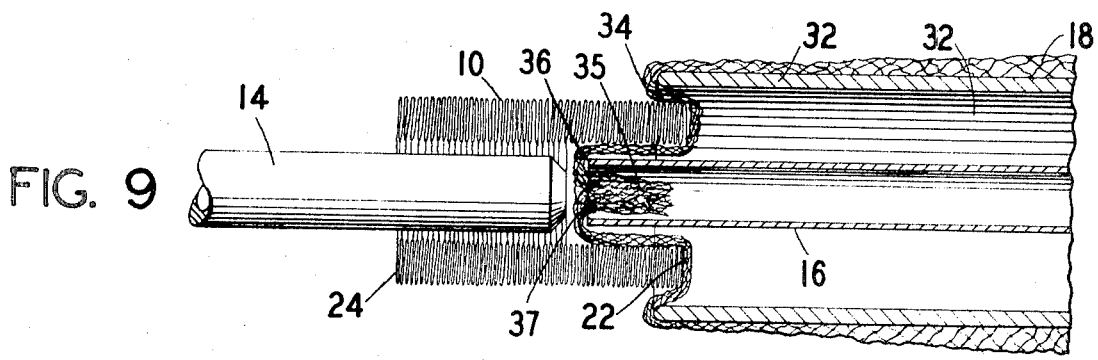
Figure 10:
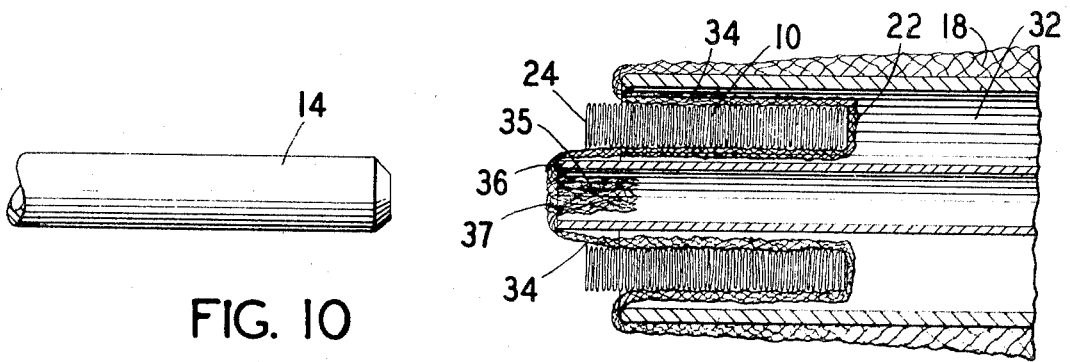

FIG. 8 is a view partially in elevation and partially in section of a shirring mandrel with a shirred and compacted stick on said mandrel and of an auxiliary mandrel having a bore, said auxiliary mandrel being coaxially mounted within a cylindrical member with a length of flexible, tubular reticulated material pulled over said member and having an end attached to the bore of the auxiliary mandrel; and FIGS. 9 and 10 are views similar to that of FIG. 8 showing various steps of a second embodiment of the method for sheathing and lining the stick.

According to the invention, there is provided a stick of shirred food casing having a central bore extending therethrough, said stick being sheathed and lined with a length of flexible, tubular, reticulated material. The tubular length of reticulated material extends in a tensioned state over the outside surface of the stick from a first end to a second end of said stick and inside the bore of the stick from the first end to the second end thereof, in such a manner that both extremities of the tubular length are at the same end of the stick, i.e., the second end, and are secured to each other at that end with a single tie or clip closure, leaving open the other end of the stick.

The invention also includes a method for sheathing and lining a stick of shirred food casing having a central bore therethrough to protect the stick from breakage and/or premature deshirring, which method comprises providing a length of tubular, flexible, reticulated material and arranging this length with one portion extending over the outside surface of the stick to be sheathed and another portion of the length through the bore of the stick in such a manner that both extremities of said length are at the same end of the stick and extend slightly beyond said same end. At this stage, the outside surface of the stick is sheathed within the length of reticulated material and the bore of the stick is lined with the same length of reticulated material. Then, the two extremities of the length are pulled to tension the reticulated material endwise around the shirred and compacted wall of the stick and are secured to each other, such as by tying or with a clip, for example.

The expression "reticulated material" as used herein and in the appended claims should be understood to refer to a woven, a knitted or a braided fabric of natural or artificial fibers, or to a material which has been perforated so as to resemble a network. Materials such as cheesecloth, flat or rib knits or any open-mesh fabric, or a perforated thermoplastic film, for example, may satisfactorily be used. A nonwoven net of thermoplastic fibers, such as a polyethylene net, for example, is preferred.

A tubular, reticulated material is particularly suitable for use in the invention because of the diametrical extensibility of such material which, when coupled with the longitudinal tension applied to the sheathing length inside and outside of the stick before and after tying the ends thereof to each other, contracts the sheathing material to provide a binding fitting snugly around the stick. Moreover, the reticulated material permits rapid and uniform water soaking of the inside and outside walls of the stick while maintaining the integrity of the stick throughout these operations. A further advantage of the binding of the invention resides in the fact that it does not have to be removed from the stick before stuffing, as will later be explained in detail.

Referring now to the drawing, there is shown in FIG. 1 a stick 10 of shirred tubular food casing having a bore 11 (FIG. 2) extending therethrough, said stick being sheathed within a binding 12 of tubular, flexible, reticulated material according to a preferred embodiment of the invention. The binding 12 is tied at one end of the stick 10, thus closing the bore 11 at said one end only.

A first embodiment of the method of producing the sheathed stick of FIG. 1 is illustrated in FIGS. 2 to 6. FIG. 2 shows the stick 10 on a shirring mandrel 14 after the casing has been shirred and compacted and is ready to be doffed from the mandrel 14. An auxiliary, hollow mandrel 16 having an outside diameter smaller than the bore 11 of the stick is positioned in alignment with the shirring mandrel 14 and in proximity thereto. A continuous length 18 of flexible, tubular, reticulated material in flattened or roped condition and having a leading portion 20 is fed from a supply source (not shown) through the hollow mandrel 16 towards the stick 10. The reticulated material 18 shown in the drawing is a net and is preferably made of polyethylene.

The leading portion 20 of the tubular net is opened and diametrically stretched to permit the introduction thereinto of a first end 22 of the stick 10. This leading portion 20 of the tubular net is thereafter pulled over the entire length of the stick 10 (FIG. 3) and beyond a second end 24 thereof. The outside surface of said stick is thus sheathed within said stretched portion of the tubular net. In the next steps, illustrated in FIGS. 4 and 5, the auxiliary mandrel 16, with the continuous flattened length 18 of tubular net therein, is moved to a position adjacent the shirring mandrel 14. The stick 10 is advanced from the mandrel 14 onto the auxiliary mandrel 16. During this advance, the flattened length 18 in the auxiliary mandrel is progressively opened, introduced into the bore 11 of the stick, and stretched along the outside surface of the auxiliary mandrel and thus along the surface of the bore 11, from the first end 22 of the stick 10 to a point beyond the second end 24 thereof. The auxiliary mandrel 16 with the stick 10 thereon is then moved back to its original position (FIG. 5). At this stage, the outside surface of the stick 10 is covered with a stretched portion of tubular net and the inside surface of the stick which defines the bore 11 is lined with another portion of the same length 18 of tubular net. The continuous length 18 is then severed from the portion lining the bore 11 at a point beyond the second end 24 of the stick 10, and the auxiliary mandrel 16 with the length 18 therein is withdrawn from the bore 11.

Figure 6:
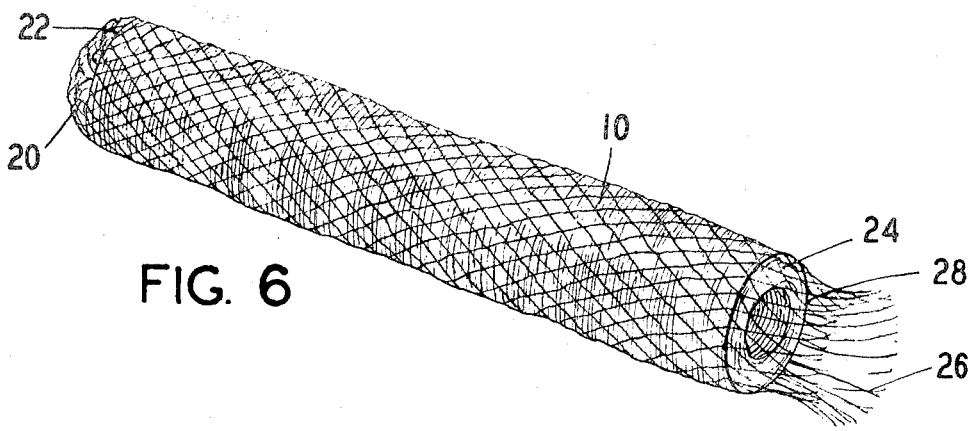
FIG. 6 is a perspective view of the stick sheathed and lined with the tubular length of reticulated material immediately before said length is secured at one end of said stick as shown in FIG. 1.

As shown in FIG. 6, both extremities 26 and 28 of the stretched tubular net are at the same end of the stick 10 which thus has its outside and inside surfaces, respectively, sheathed and lined with a single length of tubular net. The extremities 26 and 28 are then pulled to tension the net over the inside and outside surfaces of the stick and to equilibrate the tension in the net. This tension is maintained while securing the extremities 26 and 28 to each other, with a clip, for example, to form the binding 12 shown in FIG. 1.

A second embodiment of the method of producing the sheathed stick of FIG. 1 is illustrated in FIGS. 8 to 10. FIG. 8 shows the stick 10 on the shirring mandrel 14 after the casing has been shirred and compacted and is ready to be doffed from the mandrel 14. An auxiliary mandrel 16 having a bore 17 is provided in alignment with the shirring mandrel 14. The auxiliary mandrel 16 is coaxially mounted in a hollow cylindrical member 30 by means not shown, and preferably protrudes from an outboard end of the cylindrical member 30. The inside diameter of the cylindrical member 30 is larger than the outside diameter of the stick 10 and a cylindrical passage 32 for the stick 10 is thus defined by the outside surface of the auxiliary mandrel 16 and the inner surface of the cylindrical member 30. A length 18 of flexible, tubular net is fed from a supply source (not shown), pulled over the cylindrical member 30 and loosely shirred thereon. The length 18 of tubular net has a leading portion 34. An extremity 35 of the leading portion 34 is gathered and attached to an end 36 of the auxiliary mandrel 16 adjacent the shirring mandrel 14, such as by being forced into notches 37 cut into the end 36 and tucked into the bore 17 of the mandrel 16. The leading portion 34 of the net thus extends across the cylindrical passage 32, from the outer surface of the cylindrical member 30.

In the next steps illustrated in FIGS. 9 and 10, the mandrels 14 and 16 are positioned adjacent to each other and the first end 22 of the stick 10 is advanced from the mandrel 14 onto the auxiliary mandrel 16 and into the passage 32. During this advance, the first end 22 of the stick 10 engages the leading portion 34 of the tubular net extending across the passage 32 while the extremity 35 of said leading portion 34 is substantially simultaneously introduced into the bore of the stick with the auxiliary mandrel 16 to which it is attached. As the stick is further advanced into the passage 32, it progressively pulls the leading portion 34 of tubular net from the outer surface and about the outboard end of the cylindrical member 30 and simultaneously extends and stretches said tubular net over the outside surface of the stick 10 and lines the surface of the bore 11 of said stick (FIG. 10). The stick 10 is advanced far enough into the passage 32 to provide for the tubular net to extend to a point beyond the second end 24 of said stick. The mandrels 14 and 16 are brought back to their initial position and the length 18 of tubular net is then severed at a point beyond the second end 24 of the stick 10 and the resulting sheathed and lined stick is doffed from the auxiliary mandrel.

At this stage, the sheathed and lined stick is as shown in FIG. 6, with both extremities 26 and 28 of the stretched tubular net at the second end of the stick. As in the first embodiment of the method of the invention, the outside surface of the stick 10 is sheathed within a stretched portion of tubular net, and the bore 11 is lined with another portion of the same length of tubular net. The net is then tensioned and the extremities 26 and 28 thereof secured to each other under tension to form the binding 12 shown in FIG. 1, as previously explained.

As already mentioned, one of the great advantages of the stick of the invention is that after the soaking step it may be placed on a stuffing horn without first removing the binding. As shown in FIGS. 1 and 7, the binding 12 is tied at one end only of the stick 10, thus leaving the bore 11 of the stick open at the other end. Since the binding 12 is tensioned to line the inside surface of the stick as well as to fit snugly over its outside surface, a stuffing horn may easily be introduced into the bore 11, as if it were free of binding. Once the stick has been placed on the horn, the clip or the tie of the binding is removed, a few pleats at the freed end of the stick are deshirred in conventional manner to facilitate the beginning of the stuffing operation, and the whole casing is easily and rapidly stuffed with meat emulsion while the binding remains on the horn. Thus, no undesirable decompaction of the pleats is allowed to take place before stuffing of the stick.

The advantage of providing a shirred casing stick with a binding according to the invention will be illustrated by the following example.

EXAMPLE

Three 55-foot lengths of a cellulosic casing having a circumference of about 7⅛ inches were shirred on a mandrel and compacted into three identical sticks, each having a length of 15 inches, an outside diameter of about 2½ inches and a bore of about 1 5/16 inches.

A tubular plastic net having a flat width of 4½ inches was used to sheath the sticks. The tubular net was made of 12-mil strands of oriented high-density polyethylene and had three meshes per inch at 90°. The meshes were diamond-shaped.

One of the sticks was sheathed within a binding of the tubular plastic net according to the embodiment of the method illustrated in FIGS. 2 to 6 of the accompanying drawing. Another one of the sticks was sheathed within a binding of the tubular plastic net according to the embodiment of the method illustrated in FIGS. 8 to 10 and 6 of the drawing. The extremities of the tubular length of plastic net sheathing and lining each stick were tied to each other under tension with a bent metal clip. The third stick was provided with a conventional tubular core with a peg extending transversely through the walls of the core at both extremities thereof to restrain the stick endwise.

The three sticks were then immersed and soaked in water for 15 minutes and thereafter, respectively, placed on three identical stuffing horns. The first two sticks were quickly and easily placed on their respective horn in one operation without removing the binding as above described, each horn sliding smoothly through the open bore of the stick lined with the net. The placement of the third stick on its horn, however, required several manipulations: the horn was introduced into one extremity of the tubular core, then the peg at that extremity was removed while the stick had to be held at the end of the horn. The horn was further introduced into the core until it reached the second peg which had to be removed to complete full insertion of the horn into the tubular core of the stick. Furthermore, the pleats of the shirred stick tended to decompress after removal of the second peg, whereas the net sheathing and lining the first two sticks prevented such a decompression even after removal of the clip.

Although the method of the invention has been described with particular reference to the use of an auxiliary mandrel cooperating with a shirring mandrel and to sheathing and lining a shirred casing stick by relative movements of said stick and said mandrels with respect to each other, it should be well understood that the invention is not limited thereto and extends to other modifications obvious to those skilled in the art. For example, the stick could be sheathed and lined by hand. Also, for example, the length of reticulated material could first be passed through the bore of the stick and then pulled back over the outside surface of the stick.

What is claimed is:

1. A method for sheathing and lining a stick of shirred food casing material having a central bore therethrough to protect the stick from breakage and/or premature deshirring, which method comprises:
    providing a length of tubular, flexible, reticulated material;
    arranging the same with one portion extending over the outside surface of a stick to be sheathed and another portion thereof through the bore of said stick with the extremities of said length being at the same end of said stick;
    applying tension to said material to stretch the same and to place said stick in longitudinal compression;
    and uniting the extremities of said length while maintaining said material under tension;
    wherein said one portion of said length is extended over the entire outside surface of the stick before said other portion of said length is passed into the bore of said stick and extended therethrough.

2. A method as claimed in claim 1, in which a continuous length of tubular, flexible, reticulated material is provided from a supply and is severed from said supply at said same end of said stick.

3. A method for sheathing and lining a stick of shirred food casing material having a central bore therethrough to protect the stick from breakage and/or premature deshirring, which method comprises:
    providing a length of tubular, flexible, reticulated material;
    arranging the same with one portion extending over the outside surface of a stick to be sheathed and another portion thereof through the bore of said stick with the extremities of said length being at the same end of said stick;
    applying tension to said material to stretch the same and to place said stick in longitudinal compression;
    and uniting the extremities of said length while maintaining said material under tension;
    wherein said one portion and said other portion of said length are arranged, respectively, extending over the outside surface of the stick and through the bore thereof substantially simultaneously.

4. A method as claimed in claim 3, in which a continuous length of tubular, flexible, reticulated material is provided from a supply and is severed from said supply at said same end of said stick.

* * * * *